Nov. 19, 1957 L. B. BROWDER 2,813,453
FILM EDITING MACHINE
Filed April 22, 1953 7 Sheets-Sheet 1

INVENTOR
L. B. BROWDER
BY
ATTORNEY

Nov. 19, 1957 L. B. BROWDER 2,813,453
FILM EDITING MACHINE

Filed April 22, 1953 7 Sheets-Sheet 3

INVENTOR
L. B. BROWDER
BY
J. F. McEneany
ATTORNEY

Nov. 19, 1957 L. B. BROWDER 2,813,453
FILM EDITING MACHINE
Filed April 22, 1953 7 Sheets-Sheet 4

INVENTOR
L. B. BROWDER
BY
ATTORNEY

Nov. 19, 1957     L. B. BROWDER     2,813,453
FILM EDITING MACHINE

Filed April 22, 1953     7 Sheets-Sheet 5

INVENTOR
BY L. B. BROWDER

ATTORNEY

Nov. 19, 1957  L. B. BROWDER  2,813,453
FILM EDITING MACHINE

Filed April 22, 1953  7 Sheets-Sheet 6

INVENTOR
L. B. BROWDER
BY
ATTORNEY

Nov. 19, 1957 L. B. BROWDER 2,813,453
FILM EDITING MACHINE
Filed April 22, 1953 7 Sheets-Sheet 7

INVENTOR
L. B. BROWDER
BY
J. F. McEneany
ATTORNEY

United States Patent Office 2,813,453
Patented Nov. 19, 1957

2,813,453

FILM EDITING MACHINE

Lewis B. Browder, La Canada, Calif., assignor, by mesne assignments, to Westrex Corporation, a corporation of Delaware Application April 22, 1953, Serial No. 350,417

3 Claims. (Cl. 88—16.2)

This invention relates to film editing apparatus and particularly to improvements in such apparatus which facilitates the simultaneous editing of a photographic picture film and a record of the accompanying sound recorded on a separate photographic or magnetic sound film.

The object of the invention is to provide a relatively noiseless film editing apparatus incorporating novel features which facilitate efficient editing of separate picture and sound films.

A feature of the invention resides in the provision of a film editing apparatus having individual reversible film drives for the separate picture and sound films and in which means are provided for readily interlocking the two film drives whereby the separate sound and picture films may be driven simultaneously from either the sound film drive or from the picture film drive.

A further feature of the invention resides in the provision of novel means to mechanically interlock the separate film drives through a differential drive, an element of which is manually operable to advance or retard one film with respect to the other to bring the reproduced sound and projected picture image into synchronism.

A still further feature of the invention resides in the provision of a continuous system of picture projection having a rotatable optical element which is driven by the picture film drive and which may be rotated relative to the picture film drive an amount sufficient to properly frame the picture image on a viewing screen.

These and other features of this invention will be more clearly understood by references to the following description when read in connection with the accompanying drawings in which.

Figure 1:
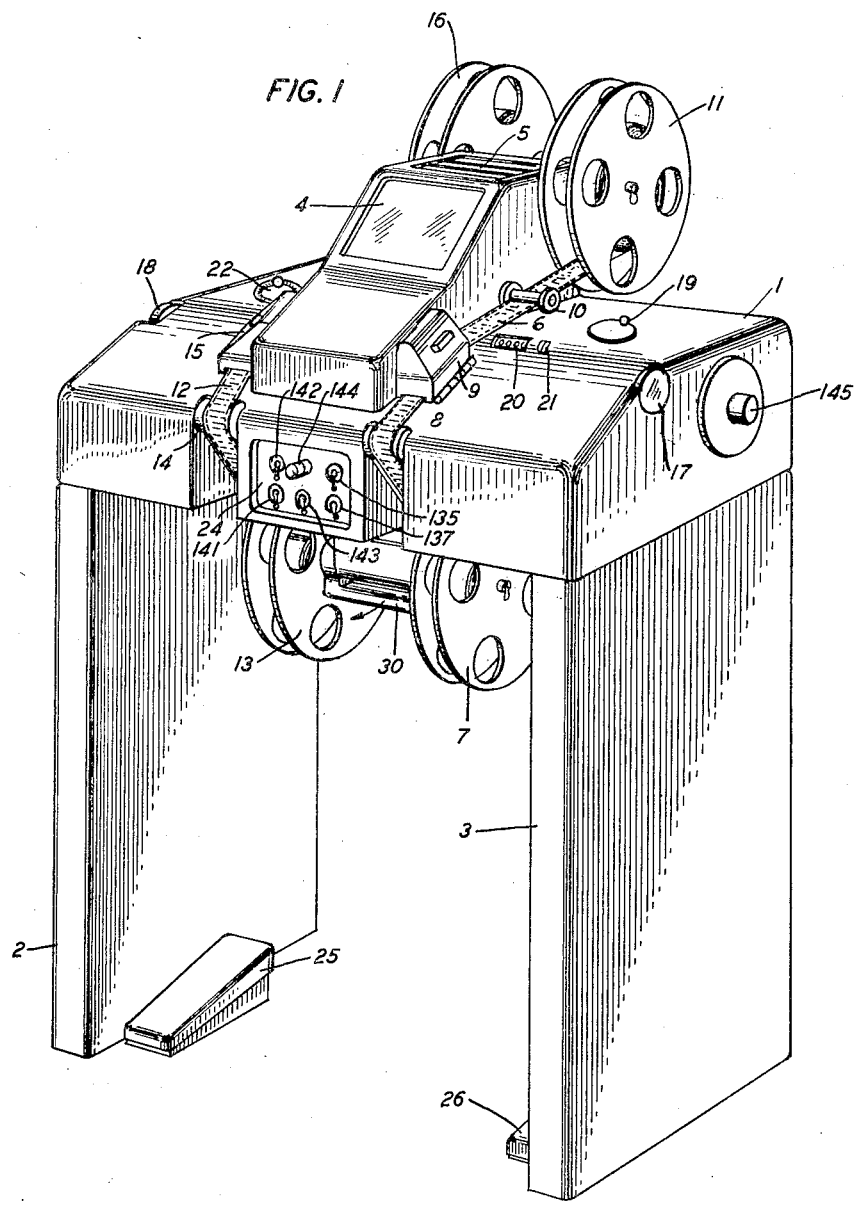
Fig. 1 is a view in prospective of the film editing machine in accordance with this invention.

Referring to Fig. 1, an aluminum casting 1 is supported by legs 2 and 3. This casting houses the mechanical, optical and transmission components of the film editing apparatus including a projection screen 4 and a loudspeaker 5. The path of a picture film 6 is from a reel 7 over a roller 8, past a picture projecting aperture located beneath pivoted member 9 and under a roller 10 to a take-up reel 11. A photographic or magnetic sound film 12 is drawn from a feed reel 13 over roller 14, through sound reproducing units disposed beneath pivoted member 15 to take-up reel 16.

A handwheel 17 is provided to permit movement of the picture film 6 in forward or reverse directions when small movement of the film is desired. A similar handwheel 18 provides means for manually moving the sound film 12 in forward or reverse directions. A rotatable disc 19 is provided to permit a film editor to frame the picture image at the screen 4. A counter 20, provided with a reset wheel 21, provides means indicating the number of feet of picture film driven through the editing apparatus. A rotatable dial 22 is provided to permit the film editor to advance or retard one film with respect to the other when their respective drives are mechanically interlocked and driven by either one of the driving means. Synchronization between the picture image projected on screen 4 and the sound reproduced from loudspeaker 5 is quickly and accurately obtained by operation of dial 22.

The front panel 24 mounts five switches, the function of each switch to be explained hereinafter.

A pedal 25, when depressed, operates to close the circuit switch between a source of power and an electric motor for driving the sound film 12. A pedal 26, when depressed, closes the operating circuit for a motor which powers the driving mechanism for picture film 6. As will be explained hereinafter, a rheostat operated by pedal 26 controls the speed of the motor for the picture film.

Figure 2:
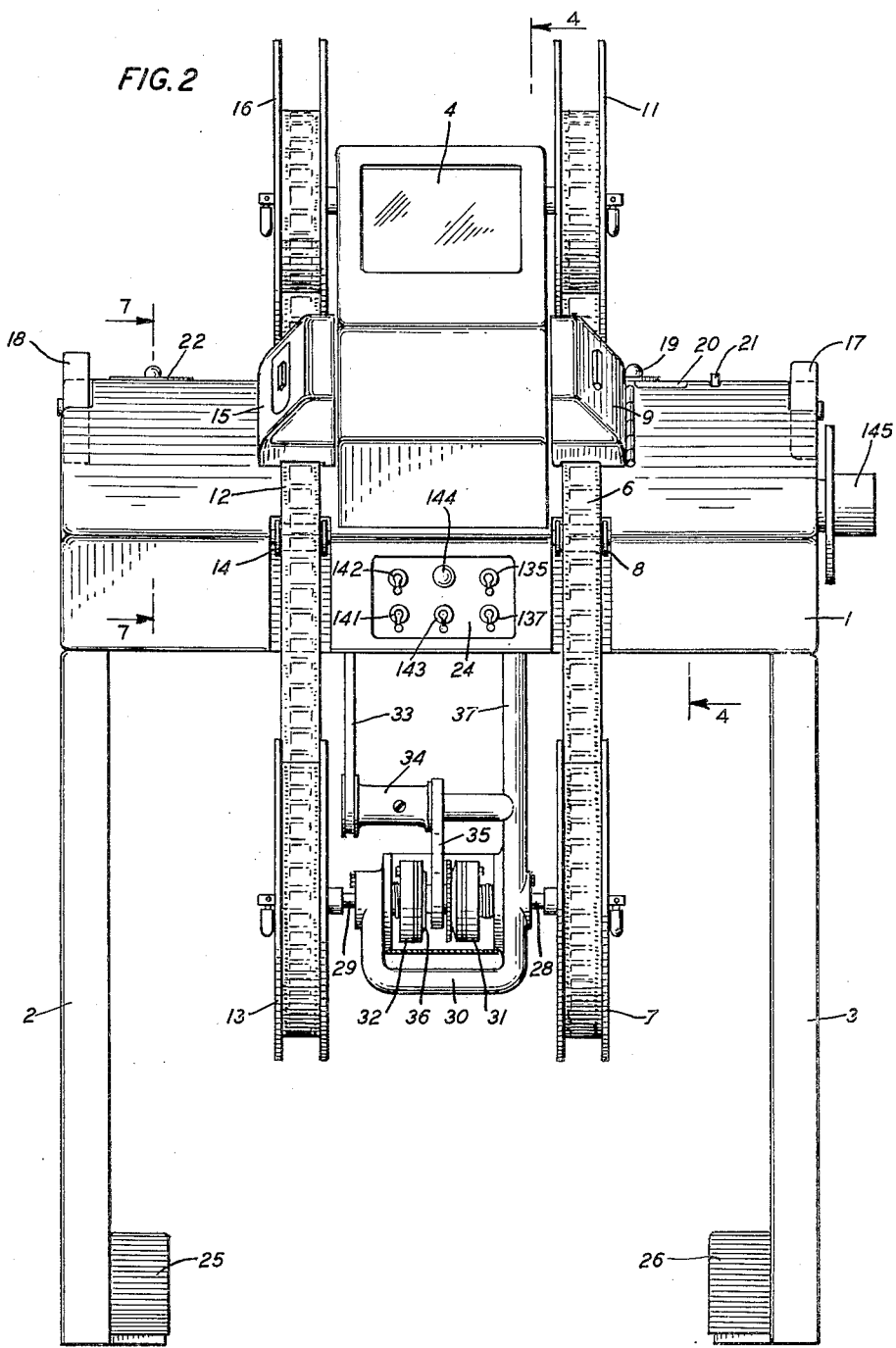
Fig. 2 is a front elevation of the film editing apparatus in accordance with this invention.

Referring to Fig. 2, it will be seen that the feed reels 7 and 13 are mounted on spindles 28 and 29, respectively. These spindles 28 and 29 are rotatably mounted in and extend through a U-shaped arm 30. The end of spindle 28 is secured to the driven element of a friction clutch 31 and spindle 29 is secured to the driven element of a friction clutch 32. A toothed belt 33, driven from one of the film driving means, produces rotation of a toothed pulley 34 which in turn drives a toothed belt 35. The belt 35 drives a pulley secured to a shaft 36. A one-way engaging clutch is provided between the shaft 36 and the driving element of each of the friction clutches 31 and 32. When the films 6 and 12 are driven in the forward direction, as indicated by the arrows, the spindles 28 and 29 and, therefore, their respective feed reels 7 and 13, are free to rotate with slight braking friction introduced by the friction clutches. If, however, the direction of rotation of the pulley 34 is reversed, the one-way driving clutches on shaft 36 are positively engaged to thus drive the driving element of each of the friction clutches 31 and 32. Spindles 28 and 29 and their respective reels 7 and 13 are then driven as take-up reels. A similar reel drive is provided for reels 11 and 16. Arm 37, which extends from bracket 30, is attached to the undersurface of casting 1.

Figure 3:
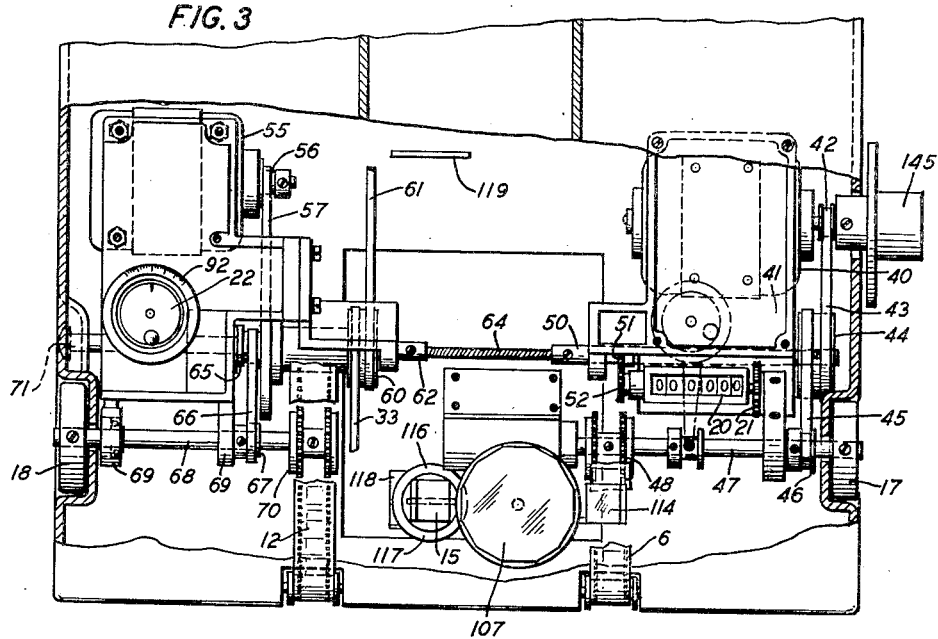
Fig. 3 is a plan view showing the arrangement of the component units in the film editing apparatus.
Figure 4:
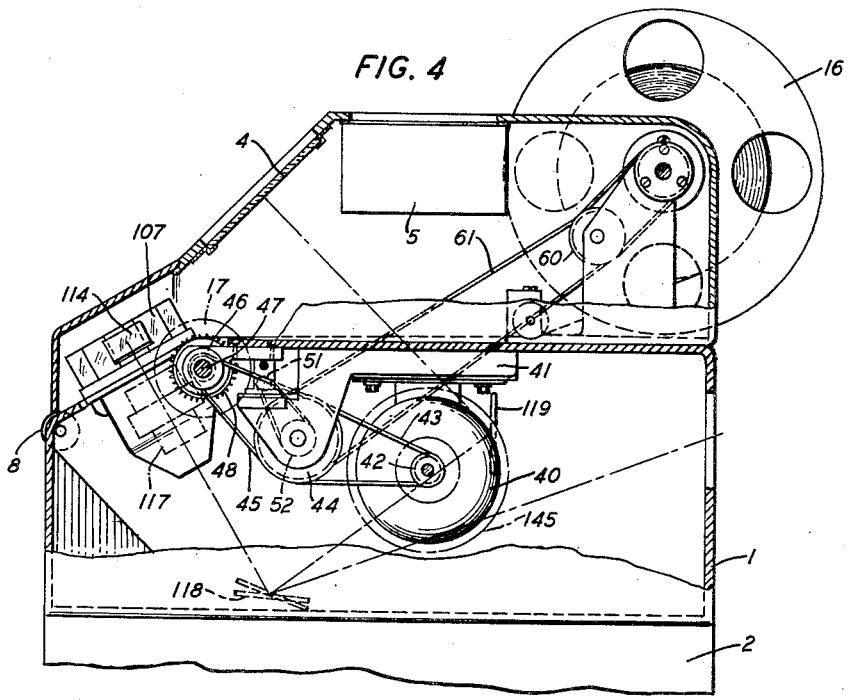
Fig. 4 is a section taken through line 4—4 of Fig. 3.

Referring to Fig. 3, an electric motor 40, suspended from a bracket 41, drives a pulley 42. A toothed belt 43, driven by pulley 42, produces rotation of the toothed drum 44. A toothed belt 45, driven by toothed drum 44, produces rotation of a toothed drum 46 secured to shaft 47. A driving sprocket 48 is secured to shaft 47. This sprocket 48 engages and drives the picture film 6 past the picture projection aperture. Handwheel 17 is also secured to shaft 47 and provides means whereby, with power disconnected from the motor 40, the sprocket 48 may be manually turned in either direction. Toothed drum 44 is secured to and produces rotation of a shaft 50. The shaft 50 has mounted thereon a gear 51 which meshes with gear 52 mounted on the shaft of the footage counter 20.

Figure 9:
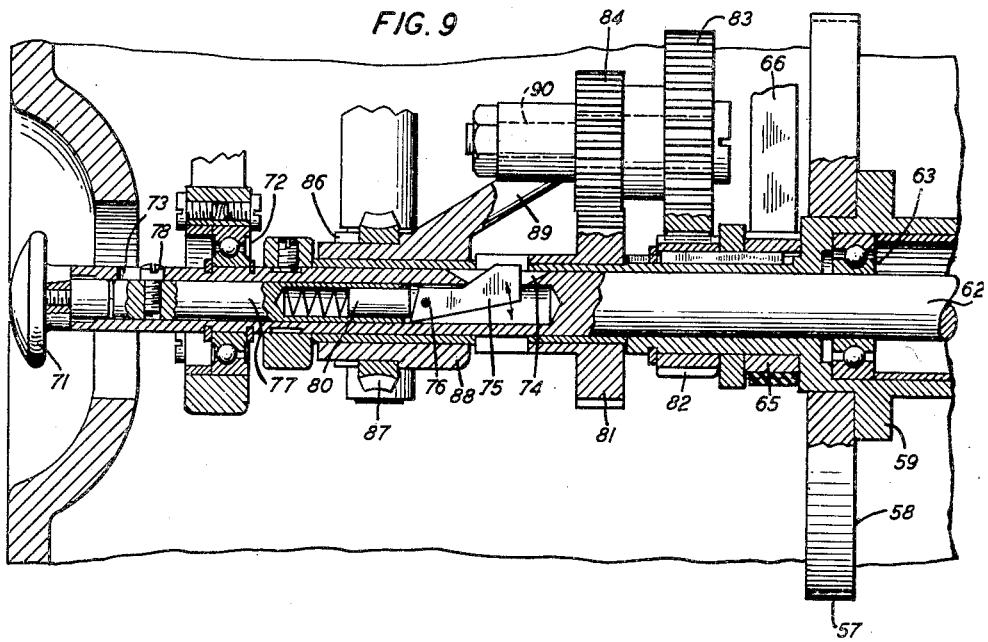
Fig. 9 is an enlarged detailed showing of the mechanism for interlocking the sound film and picture film drives.

An electric motor 55 produces rotation of a toothed pulley 56. A toothed belt 57 produces rotation of a toothed drum 58 which is attached to a hub 59. The opposite end of hub 59 is provided with a toothed drum 60. A toothed belt 61, driven by drum 60, extends upwardly and engages the driving mechanism for take-up reels 11 and 16. The toothed belt 33, driven by drum 60, extends downwardly to engage the driving mechanism for the reels 7 and 13 as shown in detail in Fig. 2. The hub 59, as shown in detail in Fig. 9, is rotatably mounted on a shaft 62 by means of ball bearings, as shown at 63. A drive shaft 64 connects shaft 50 and shaft 62. A toothed drum 65, rotatable with hub 59, drives a toothed belt 66 which engages a toothed hub 67 secured to shaft 68. Shaft 68, which is rotatable in bearings 69, has secured thereto a film driving sprocket 70 which engages and drives the sound film 12. The handwheel 18 is secured to the opposite end of shaft 68.

Referring particularly to Fig. 9, the end of shaft 62 is rotatable in bearing 72. The end of this shaft 62 is centrally bored and is provided with a slot 73 and a further slot 74. An element 75 is pivoted at 76 within the centrally bored end of shaft 62. A rod 77 is mounted in the centrally bored portion of shaft 62 and is movable axially of the shaft within the limits permitted by the head of set screw 78 in the slot 73. A knob 71, within easy reach of the operator, permits rod 77 to be moved axially of the shaft 62. A spring urged weight 80 in the end of rod 77 engages the angled face of locking element 75. In the position as shown in Fig. 9, the rod 71 is at its innermost position to force the locking element 75 upwardly through slot 74 to lock a normally freely rotatable gear 81 to shaft 62.

A gear 82, keyed to hub 59, engages and produces rotation of an integral pair of epicyclic gears 83 and 84. Gear 84 meshes with gear 81. When the rod 77 is moved to the left, the locking member 75 is forced by gravity to a position within the shaft 62 and the gear 81 is freely rotatable on shaft 62. Under these conditions, the gears 83, 84 and 81 are in free rotation driven from gear 82. However, when the rod 77 is pushed to the right as shown in Fig. 9, the element 75 locks gear 81 to shaft 62 to thereby interlock the picture film driving mechanism with the sound film driving mechanism through shafts 62, 64 and 50. Under these conditions, either one of the motors 40 or 55 may be disconnected from the source of power by release of downward pressure on either one of the pedals 25 or 26 and both film drives driven at constant speed by the motor 55 or at variable speed by the motor 40.

At the time the picture film drive and the sound film drive are interlocked, the reproduced sound may not be in synchronism with the projected picture. Therefore, means are provided to permit the action film to be advanced or retarded with respect to the sound film to obtain the synchronization of sound and picture while the films are in motion. This is accomplished by the manually operated planetary gear system shown in Fig. 9. The gear 82 drives the integral pair of epicyclic gears 83 and 84, which in turn drive the gear 81 or the drive may be from gear 81 through gears 83 and 84 to gear 82 depending upon which motor is being used as the driving source. The picture film drive is advanced or retarded by rotating the framing knob 22 which is secured to a shaft 85. The other end of shaft 85 has attached thereto a worm 86 which meshes with a gear 87. Gear 87 is secured to a carrier member 88 which is rotatable on a sleeve bearing about shaft 62. An integral arm 89 extends upwardly and forms the support for shaft 90 on which integral gears 83 and 84 are rotatably mounted. In a practical application, the gear 81 is provided with 24 teeth, the gear 83 with 36 teeth, the gear 84 with 30 teeth and the gear 81 with 30 teeth. The ratio of gears is such that one complete rotation of framing knob 22 produces relative movement of the picture film through the height of one picture frame. The amount by which the picture film drive has been retarded or speeded up relative to the sound drive is shown on a dial indicator 92 which is driven from shaft 85 through gears 93, 94, 95 and 96.

Figure 10:
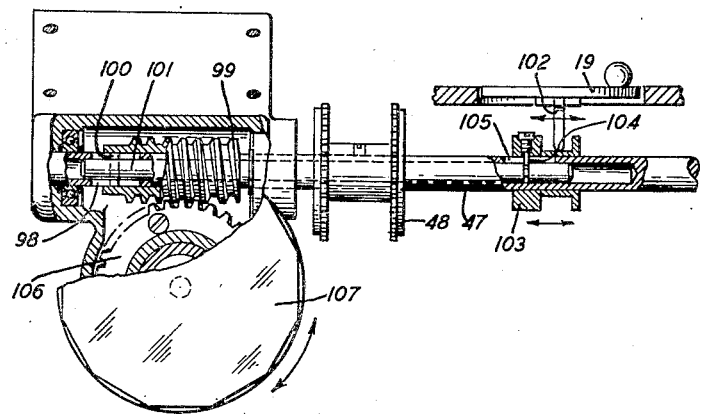
Fig. 10 is an enlarged view of the picture film driving sprocket and the means provided for adjusting the rotational position of the prism element of the picture projecting optical system to frame the picture image at the screen.

Referring particularly to Figs. 3 and 10, the end of shaft 47 is provided with a pair of diametrically opposed slots 98. A worm gear 99, mounted on shaft 47, is secured thereto by means of a pin 100 extending through the gear and the slots 98 in shaft 47. The pin 100 also extends through a rod 101 disposed in the centrally bored section of shaft 47. Rod 101 is movable axially of the shaft 47 by rotation of framing knob 19 which is provided adjacent its periphery with a downwardly extending pin 102. Pin 102 engages slidable collar 103 which is provided with a pin 104 extending through slot 105 in shaft 47 to engage rod 101. It will, therefore, be seen that while gear 99 is rotated by shaft 47, this gear may also be moved axially of this shaft by operation of the framing knob 19.

A gear 99 meshes with gear 106 and produces rotation thereof. Gear 106 has mounted thereon a twelve-sided prism 107 which is an element of the optical system provided in the continuous system of picture projection. If the projected picture is not accurately framed on screen 4, the position of the prism 107 in the optical system is altered sufficiently by axial movement of gear 99 to properly frame the picture at the screen.

Figure 11:
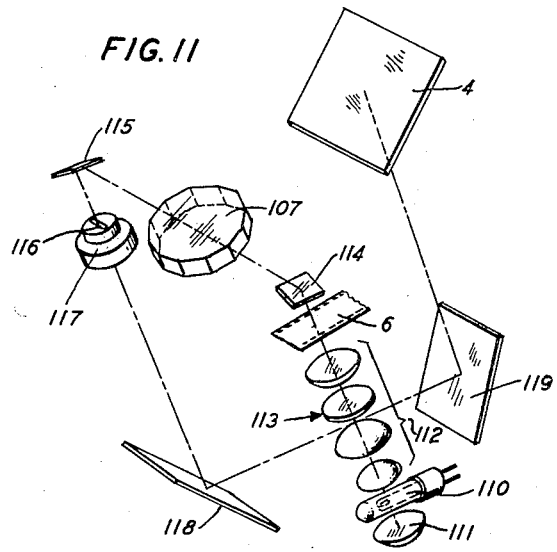
Fig. 11 is an enlarged exploded perspective of the picture projecting optical system.

A substantially noiseless film editing apparatus is provided by the use of a continuous system of picture projection and the use of toothed belt drives thus eliminating the relatively noisy intermittent film drive and gear mechanisms. Rear projection of the picture image on screen 4 is obtained by a projection system shown in Fig. 11. A lamp 110, reflector 111 and a three-element condenser lens system 112 are mounted as a unit below the picture gate located at 9 in Fig. 1. A heat-absorbing filter 113 is provided in the lens system which permits the picture film to remain stationary in the picture gate for an indefinite period without causing damage to this film. A mirror 114, mounted in member 9, bends the light beam after its passage through film 6 and directs the beam toward the rotatable twelve-sided prism 107. Each face of the prism is active for a total rotation of the prism of 30 degrees. A second mirror 115 deflects the light beam through an oblong aperture in member 116 secured to the housing for an objective lens 117. The small dimension of the aperture in member 116 is in the plane of the prism to keep its subtended angle at a minimum consistent with reasonable light conservation. The dimensions of the aperture 116 are made such as to prevent any face of the twelve-sided prism 107 from following the film 6 through more than 15 degrees from normal. Under this condition, the rotation of any prism face to 15 degrees from normal brings the succeeding prism face in at minus 15 degrees to normal and continuous projection is accordingly achieved.

Following the objective lens 117, there is provided a mirror 118 and a following mirror 119 which fold the optical system within the available space and project an image on the screen of the same orientation as the image on the film 6, that is, the film in the gate is threaded so as to appear upright and properly oriented from left to right, and this relationship is maintained in the projected image on the screen.

Projection of an enlarged image on a wall or screen may be accomplished if desired by means (not shown) for tilting mirror 118 clockwise and permitting the projection beam to pass through an opening in the rear of housing 1. In this case, it is necessary to insert a simple lens between the prism 107 and the projection lens 117 so that the orientation of the projected image on the wall or screen is the same as that of the image in the gate.

Figure 5:
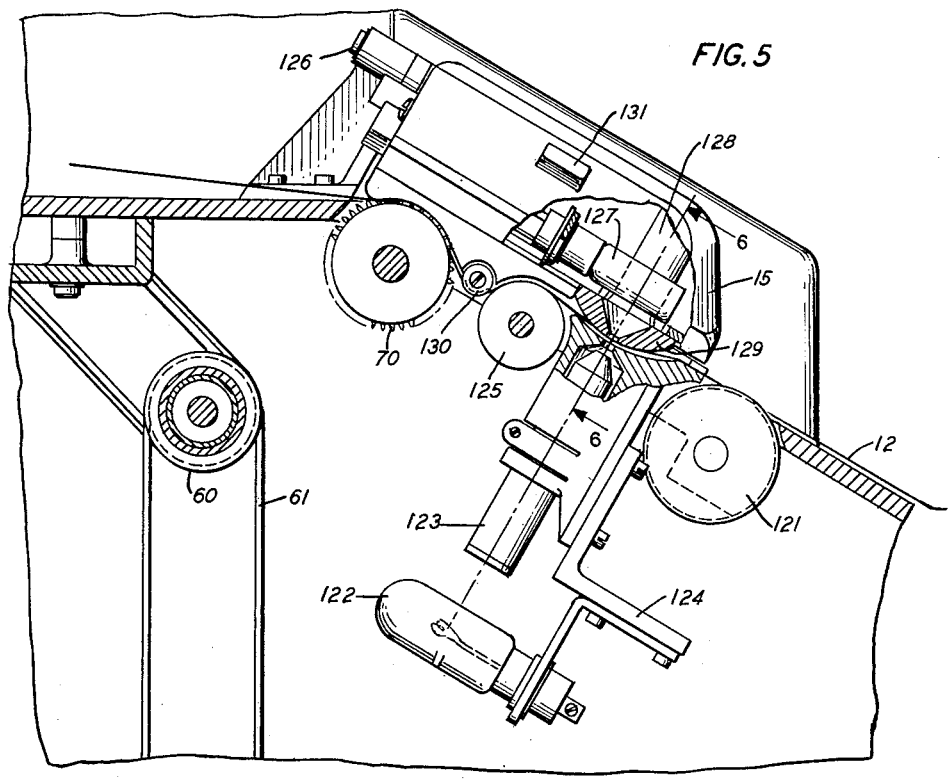
Fig. 5 is an enlarged view, partly in section, showing the film gate for guiding the sound film past the point of translation.
Figure 6:
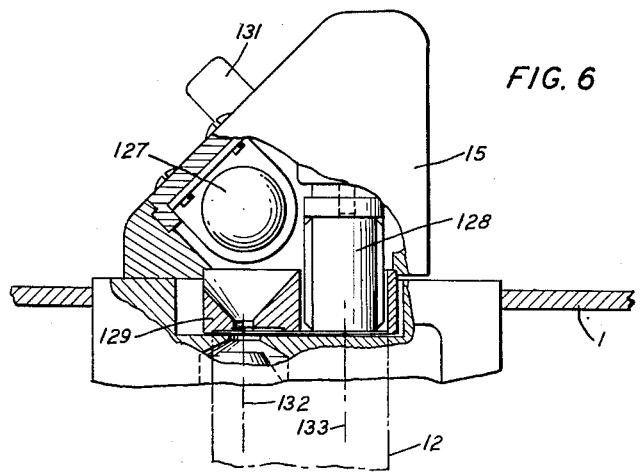
Fig. 6 is an end view, partly in section, of the sound film gate showing the relative positions of a reproducing photoelectric cell and a reproducing magnet.
Figure 7:
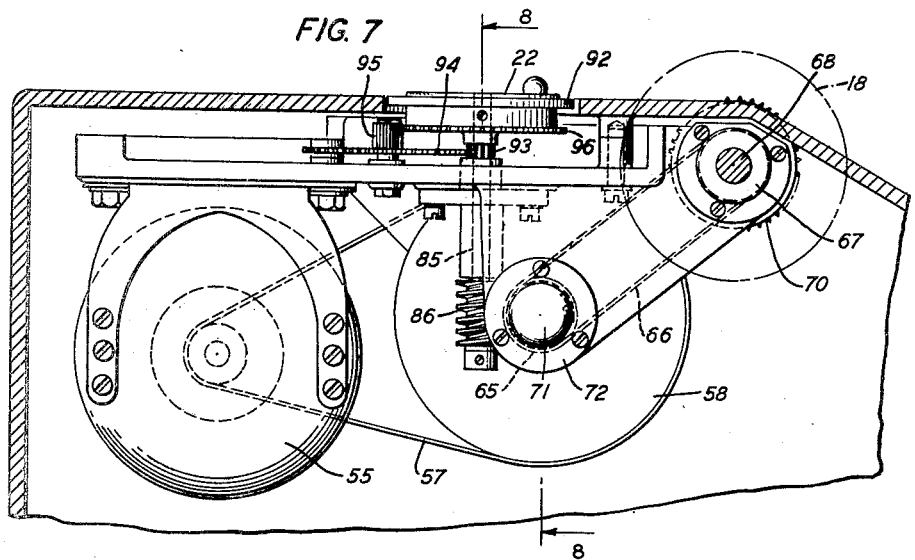
Fig. 7 is an enlarged view of a section taken through line 7—7 of Fig. 3.
Figure 8:
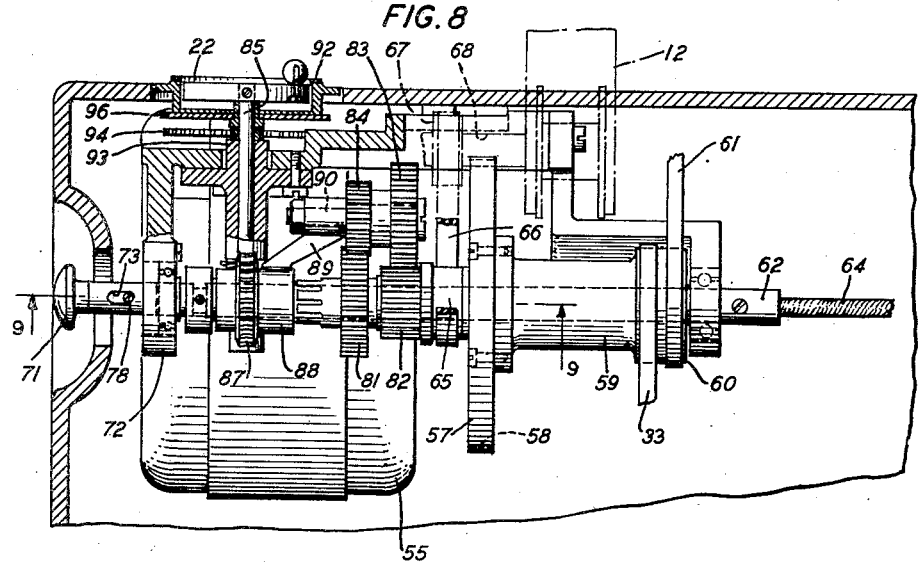
Fig. 8 is a section taken through line 8—8 of Fig. 7.

Figs. 5 and 6 show the film gate provided at the point of sound translation from either a photographic or a magnetic sound track on film 12. As shown in Fig. 5, sprocket 70 engages and produces the forward motion of film 12 in the direction indicated by arrows. The film 12 first engages a guide roller 121 after which it passes in front of a reproducing optical system including an exciter lamp 122 and a lens tube 123, both of which are mounted on bracket 124. Following its passage in front of the sound reproducing light beam, the film 12 engages and produces rotation of an inertia roller 125. It is then engaged by the driving sprocket 70.

Member 15 comprises a housing pivoted at hinge 126. This housing 15 has mounted therein a reproducing photoelectric cell 127 and a magnetic reproducing head 128. The film engaging under surface of member 15 is provided with an apertured convex film guide 129 and a roller 130. When the member 15 is closed to operating position, the roller 130 introduces a loop in the film and partially wraps the film about the inertia roller 125. The inertia roller in combination with the compliance of the film loop provides adequate attenuation of 96-cycle flutter introduced by the film sprocket 70. A projection 131 provides means by which member 15 may be moved without its pivot 126 to permit the film 12 to be threaded in the gate.

Fig. 6 shows the arrangement of optical and magnetic sound tracks on film 12 and their relation to the appropriate sound reproducing means located in member 15. Line 132 represents the center line of a photographic sound track to be presented at the sound reproducing optical system, while line 133 represents the center line of a magnetic sound track to be presented for reproduction by the magnetic head 128.

Figure 12:
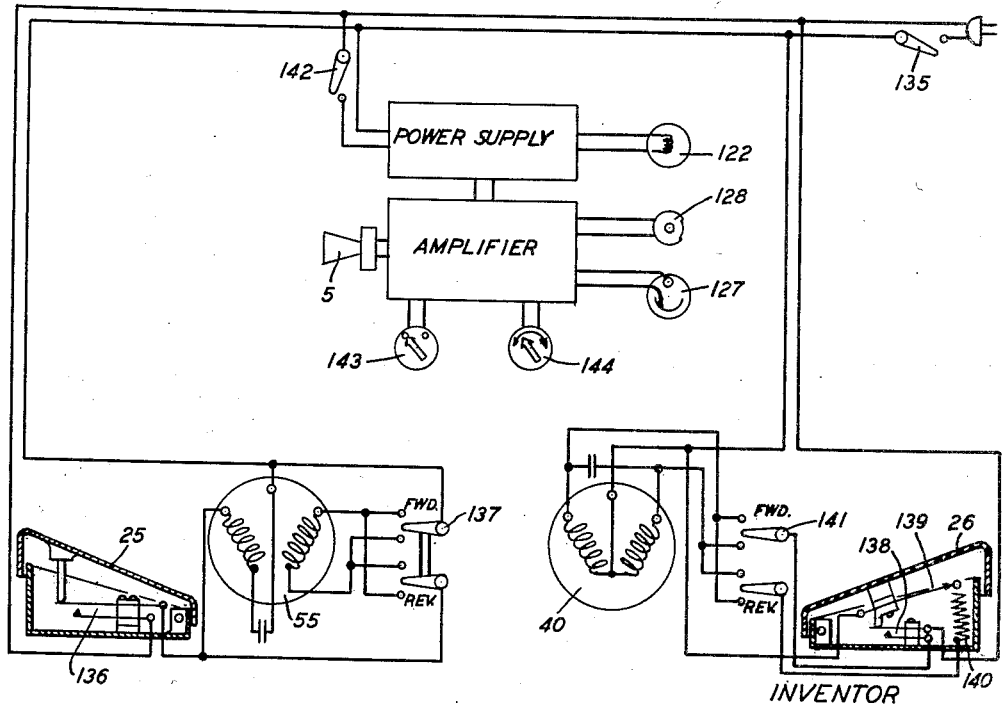
Fig. 12 is a schematic of the electrical circuit showing the separate film driving motors and the means for controlling their operation.

Referring to Fig. 12, a switch 135 connects the electrical elements of the apparatus to an appropriate voltage source. As will be seen from this drawing, the pedal 25, when depressed, closes a switch 136 to complete the circuit to constant speed motor 55 to produce rotation thereof in either forward or reverse direction, depending upon which contacts are closed by switch 137. An additional switch (not shown) may be provided to permit an operator to close the circuit to motor 55 without using pedal-operated switch 136.

Pedal 26, when depressed, closes switch 138 and connects brush 139 to a speed controlling rheostat 140. Depending upon the position of switch 141, the motor 40 is driven in either forward or reverse directions and its speed is controlled by an operator by foot pressure on pedal 26. Switch 142, when closed, connects the sound reproducing units to the source of voltage. A switch 143 provides means for selecting either photographic or magnetic sound reproduction. Element 144 controls a potentiometer by means of which the volume of the reproduced sound may be adjusted.

Switches 135, 137, 141, 142, 143 and potentiometer control element 144 are mounted on the front panel 24 of the film editor within easy reach of the operator, as shown in Figs. 1 and 2.

It is frequently desirable in the editing of separate picture and sound films to edit relatively short lengths of prospective background picture or special effects sound films. In such instances, it is usual to run these short lengths of film through the editing machine without using film reels, that is, the film is guided by hand to the reproducing gate and allowed to drop to the floor or into a box behind the editing machine after it has been reproduced. A rewind flange 145, mounted on shaft of motor 40, is provided on the outside of housing 1 to permit the rewinding of these unreeled lengths of film.

The editing apparatus disclosed herein may also be employed in the editing of composite sound and picture film, in which case the composite film, after passing through the picture gate 9, is looped back and fed into the sound gate 15. These two gates are close enough together to permit the sound and picture to be maintained in synchronism.

The film editor in accordance with this invention provided complete facilities for convenient and efficient editing of related picture and sound films.

What is claimed is:

1. The combination in a film editing machine having a sound reproducing station and a picture reproducing station, of means for driving a sound film past said sound station comprising an electric motor, a shaft driven by said motor, a gear secured to said shaft and a film engaging sprocket driven by said shaft, means for driving a picture film past said picture reproducing station comprising a variable speed electric motor, a shaft driven by said variable speed electric motor, a picture film engaging sprocket driven by said variable speed motor and a gear freely mounted on said second-mentioned shaft, said freely mounted gear being in axial alignment with said first-mentioned gear, an integral pair of freely rotatable epicyclic gears connecting said first-mentioned gear with said second-mentioned gear, one of said pair of epicyclic gears having a greater number of gear teeth than the other of said pair of gears, manually operable means for mechanically locking said second-mentioned gear to said second-mentioned shaft, and manually operable means for moving said integral pair of epicyclic gears around the periphery of said first-mentioned and second-mentioned gears to retard or advance said first-mentioned shaft with respect to said second-mentioned shaft to obtain synchronous reproduction of the picture and accompanying sound.

2. The combination in a film editing machine having a sound reproducing station and a picture reproducing station, of means for driving a sound film past said sound reproducing station comprising an electric motor, a shaft driven by said motor and a film driving sprocket secured to said shaft; a second shaft driven by said motor, said second shaft having a central boring therethrough and a gear secured thereto; means for driving a picture film past said picture reproducing station comprising an electric motor, a shaft driven by said second-mentioned motor, and a film driving sprocket secured to said shaft; said last-mentioned shaft extending through the central boring in said second-mentioned shaft and a gear loosely mounted on said last-mentioned shaft; an integral pair of freely rotatable gears connecting the gear secured to said second-mentioned shaft with said loosely mounted gear on said last-mentioned shaft, and means operable manually to lock said loosely mounted gear to said last-mentioned shaft whereby said second-mentioned shaft may be driven from said last-mentioned shaft or vice versa through said integral pair of freely rotatable gears.

3. The combination in a film editing machine having a sound reproducing station and a picture reproducing station, of means for driving a sound film past said sound reproducing station comprising a film engaging sprocket and a driving shaft on which said sprocket is mounted, a gear driven from said shaft, a normally freely rotatable gear mounted in axial alignment with said first-mentioned gear, an integral pair of freely rotatable axially aligned epicyclic gears one of which engages said first-mentioned gear and the other of which engages said second-mentioned gear, one of said pair of epicyclic gears having a greater number of gear teeth than the other of said pair of epicyclic gears, means for driving a picture film past said picture reproducing station, said means comprising a film engaging sprocket and a driving shaft on which said sprocket is mounted, manually operable means for mechanically locking said second-mentioned gear to said second-mentioned shaft, and manually operable means for moving said integral pair of epicyclic gears in either direction around the peripheries of said first-mentioned and said second-mentioned gears to retard or advance said first-mentioned shaft with respect to said second-mentioned shaft to obtain synchronous reproduction of the picture and accompanying sound.

References Cited in the file of this patent

UNITED STATES PATENTS

| | | |
|---|---|---|
| 1,204,771 | Hopkins | Nov. 14, 1916 |
| 1,617,991 | Dowey | Feb. 15, 1927 |
| 1,873,342 | Serrurier | Aug. 23, 1932 |
| 1,899,048 | Olinger | Feb. 28, 1933 |
| 1,932,600 | Porter | Oct. 31, 1933 |
| 2,278,781 | Harrison | Apr. 7, 1942 |
| 2,283,533 | Brueske | May 19, 1942 |
| 2,441,013 | Ehrenhaft | May 4, 1948 |
| 2,508,789 | Harrison | May 23, 1950 |